United States Patent
Lindh et al.

(10) Patent No.: US 8,848,821 B2
(45) Date of Patent: Sep. 30, 2014

(54) MAPPING PHICH RESOURCES

(75) Inventors: Lars Erik Lindh, Helsingfors (FI); Jussi Kustaa Ojala, Helsinki (FI); Frank Frederiksen, Klarup (DK)

(73) Assignee: Nokia Corporation, Espoo (FI)

( * ) Notice: Subject to any disclaimer, the term of this patent is extended or adjusted under 35 U.S.C. 154(b) by 812 days.

(21) Appl. No.: 12/866,031

(22) PCT Filed: Feb. 3, 2009

(86) PCT No.: PCT/IB2009/000185
§ 371 (c)(1),
(2), (4) Date: Sep. 2, 2010

(87) PCT Pub. No.: WO2009/098567
PCT Pub. Date: Aug. 13, 2009

(65) Prior Publication Data
US 2010/0322324 A1    Dec. 23, 2010

Related U.S. Application Data

(60) Provisional application No. 61/063,614, filed on Feb. 4, 2008.

(51) Int. Cl.
*H03K 7/06* (2006.01)
*H03K 9/06* (2006.01)
*H04L 1/18* (2006.01)
*H04L 1/16* (2006.01)
*H04L 5/00* (2006.01)

(52) U.S. Cl.
CPC ............ *H04L 1/1854* (2013.01); *H04L 5/0053* (2013.01); *H04L 5/0037* (2013.01); *H04L 1/1692* (2013.01); *H04L 1/1812* (2013.01)

USPC .......... 375/271; 375/267; 375/295; 375/299; 375/316; 370/335

(58) Field of Classification Search
USPC .......... 375/271, 295, 267, 316, 299; 370/335, 370/329
See application file for complete search history.

(56) References Cited

U.S. PATENT DOCUMENTS

| 8,116,271 B2 * | 2/2012 | Pi ................................. 370/329 |
| 2009/0196240 A1 * | 8/2009 | Frederiksen et al. ......... 370/329 |
| 2011/0002309 A1 * | 1/2011 | Park et al. ..................... 370/335 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.3.0, Dec. 2007, 121 pgs.
Motorola, 3GPP TSG RAN1 #51, R1-074588, Jeju, Korea, Nov. 5-9, 2007, Source: Motorola, Title: PHICH Assignment in E-UTRA.
International Search Report and Written Opinion of the International Searching Authority received from PCT Application No. PCT/IB2009/000185, dated May 26, 2010, 9 pages.

(Continued)

*Primary Examiner* — Ted Wang
(74) *Attorney, Agent, or Firm* — Harrington & Smith

(57) ABSTRACT

Transmissions are received on a plurality of uplink physical resource blocks. An acknowledgement or negative acknowledgement for each of the received transmissions is mapped to a downlink channel, such that linear increasing sequential indices of the physical resource blocks map to linear increasing sequential indices of n groups of the downlink channel which repeat until all the physical resource blocks are mapped, in which the downlink channel comprises a plurality of n groups.

20 Claims, 4 Drawing Sheets

7A: RECEIVING TRANSMISSIONS FROM A PLURALITY OF MOBILE APPARATUS IN A PLURALITY OF UL PHYSICAL RESOURCE BLOCKS

7B: INDICATING AN ACK/NACK FOR EACH RECEIVED TRANSMISSION IN A DL CHANNEL, WHERE THE DL CHANNEL CONTAINS INFORMATION ORGANIZED AS A PLURALITY $N$ OF GROUPS ARRANGED FOR MAPPING INDIVIDUAL PHYSICAL RESOURCE BLOCKS SUCH THAT A TRANSMISSION FOR A FIRST PHYSICAL RESOURCE BLOCK IS INDICATED BY A FIRST MODULATION CHANNEL OF A FIRST GROUP OF $N$ GROUPS, A TRANSMISSION FOR THE FIRST PHYSICAL RESOURCE BLOCK IS INDICATED BY THE SAME OR A DIFFERENT MODULATION CHANNEL OF A SECOND GROUP OF THE $N$ GROUPS, AND CONTINUING UNTIL ALL MODULATION CHANNELS ASSOCIATED WITH REMAINING ONES OF THE $N$ GROUPS ARE USED, THEN MAPPING REMAINING TRANSMISSIONS, IN ORDER, TO MODULATION CHANNELS OF EACH OF THE N GROUPS STARTING WITH THE FIRST GROUP OF THE $N$ GROUPS

(56) References Cited

OTHER PUBLICATIONS

Nokia et al., "PHICH and mapping to PHICH groups", 3GPP Draft, R1-080301, Jan. 9, 2008.

Motorola, "PHICH Channel Structure and Frequency Mapping" 3GPP Draft, R1-080071, Jan. 8, 2008.

* cited by examiner

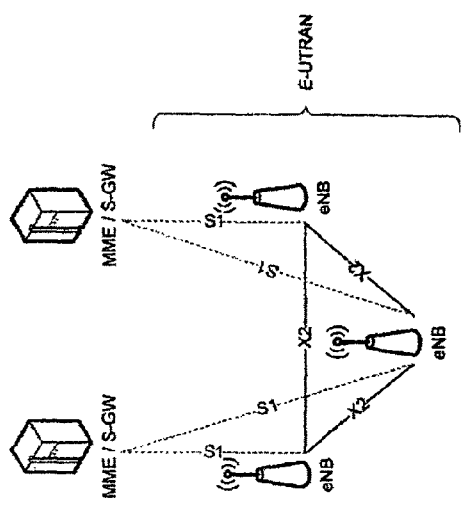
FIGURE 1: Prior Art
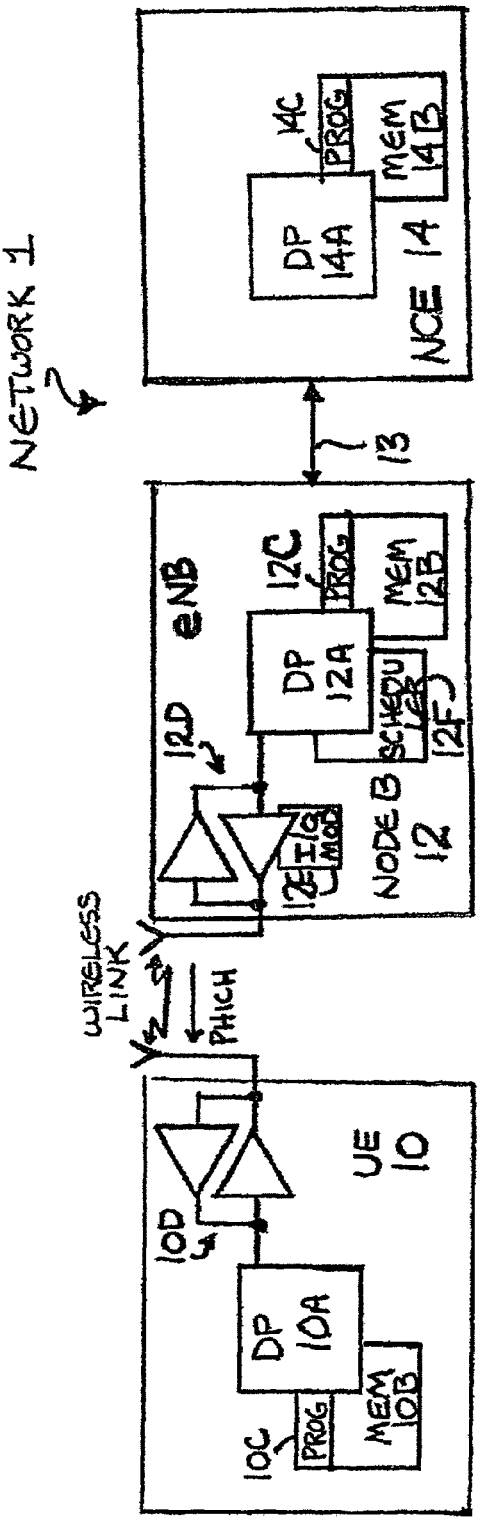
FIGURE 2
NETWORK 1

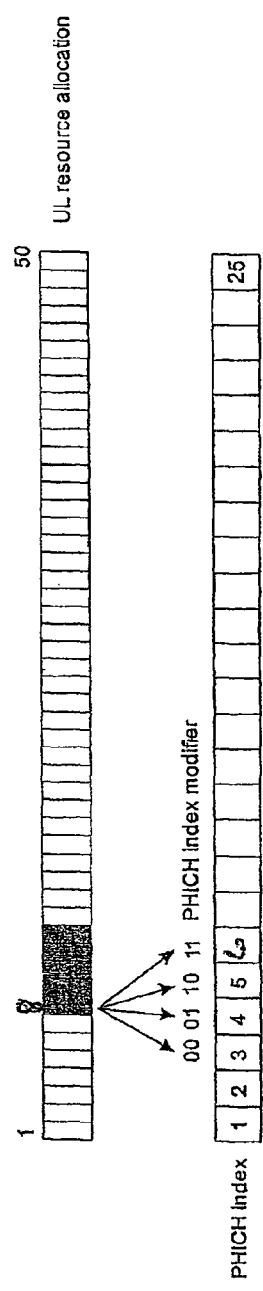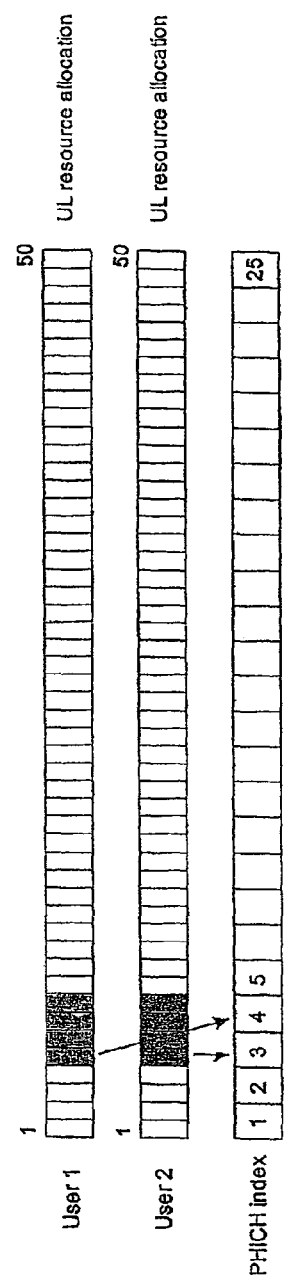

| PHICH group 1 | | PHICH group 2 | |
|---|---|---|---|
| I-channel | Q-channel | I-channel | Q-channel |
| 0 | 2 | 1 | 3 |
| 4 | 6 | 5 | 7 |
| 8 | 10 | 9 | 11 |
| 12 | 14 | 13 | 15 |

| PHICH group 1 | | PHICH group 2 | | PHICH group 3 | |
|---|---|---|---|---|---|
| I-channel | Q-channel | I-channel | Q-channel | I-channel | Q-channel |
| 0 | 3 | 1 | 4 | 2 | 5 |
| 6 | 9 | 7 | 10 | 8 | 11 |
| 12 | 15 | 13 | 16 | 14 | 17 |
| 18 | 21 | 19 | 22 | 20 | 23 |

MAPPING PHICH RESOURCES

RELATED APPLICATION

This application was originally filed as PCT Application No. PCT/IB2009/000185 on Feb. 3, 2009 and claims priority to U.S. Provisional Application No. 61/063614 filed on Feb. 4, 2008, which is incorporated herein by reference in its entirety.

TECHNICAL FIELD

The exemplary and non-limiting embodiments of this invention relate generally to wireless communication systems, methods, devices and computer programs and, more specifically, relate to techniques for signaling information between a wireless network node and a mobile device.

BACKGROUND

Various abbreviations that appear in the specification and/or in the drawing figures are defined as follows:

| | |
|---|---|
| 3GPP | third generation partnership project |
| ACK | acknowledge |
| BPSK | binary phase shift keying |
| CP | cyclic prefix |
| CSI | cyclic shift index |
| DL | downlink |
| DM RS | demodulation reference symbols |
| eNB | E-UTRAN Node B (evolved Node B) |
| HARQ | hybrid automatic repeat request |
| LTE | long term evolution (also known as E-UTRAN or 3.9G) |
| MAC | medium access control |
| MU-MIMO | multi-user multiple input/multiple output |
| NACK | not acknowledge or negative acknowledgement |
| Node B | base station |
| OFDMA | orthogonal frequency division multiple access |
| PDCP | packet data convergence protocol |
| PHICH | physical hybrid ARQ indicator channel |
| PHY | physical |
| PRB | physical resource block |
| QPSK | quadrature phase shift keying |
| RF | repetition factor |
| RLC | radio link control |
| RRC | radio resource control |
| SC-FDMA | single carrier, frequency division multiple access |
| SF | spreading factor |
| UE | user equipment |
| UL | uplink |
| UTRAN | universal terrestrial radio access network |

A proposed communication system known as evolved UTRAN (E-UTRAN, also referred to as UTRAN-LTE or as E-UTRA) is currently under development within the 3GPP. The current working assumption is that the DL access technique will be OFDMA, and the UL access technique will be SC-FDMA.

One specification of interest to these and other issues related to the invention is 3GPP TS 36.300, V8.3.0 (2007-12), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8).

FIG. 1 reproduces FIG. 4 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC (Evolved Packet Core), more specifically to a MME (Mobility Management Entity) by means of a S1-MME interface and to a Serving Gateway (S-GW or access gateway) by means of a S1-U interface. The S1 interface supports a many-to-many relation between MMEs/Serving Gateways and eNBs.

The eNB is of interest to certain exemplary embodiments of this invention, and hosts the following functions:

functions for Radio Resource Management: Radio Bearer Control, Radio Admission Control, Connection Mobility Control, Dynamic allocation of resources to UEs in both uplink and downlink (scheduling);
IP header compression and encryption of user data stream;
selection of a MME at UE attachment;
routing of User Plane data towards Serving Gateway;
scheduling and transmission of paging messages (originated from the MME);
scheduling and transmission of broadcast information (originated from the MME or O&M); and
measurement and measurement reporting configuration for mobility and scheduling.

Other documents of interest herein include 3GPP TSG RAN1 #51, R1-074588, Jeju, Korea, Nov. 5-9, 2007, Source: Motorola, Title: PHICH Assignment in E-UTRA (referred to hereafter as R1-074588), and 3GPP TSG RAN WG1 Meeting #51 bis, R1-080301, Sevilla, Spain, Jan. 14-18, 2008, Source: Nokia, Nokia Siemens Networks, Title: PHICH and mapping to PHICH groups (referred to hereafter as R1-080301).

In a wireless system such as LTE, and in the case of UL transmission with HARQ, the eNB will transmit an ACK/NACK in response to receiving an UL transmission from the UE. In accordance with recent decisions within 3GPP (January 2008 meeting in Seville) for LTE no option will be provided for not transmitting the PHICH. This implies that the PHICH resources need to be defined and used for all eNB and UE configurations. The eNB may in some circumstances need to simultaneously transmit ACK/NACKs corresponding to two or more UL transmissions. As a result, a given UE needs to determine which ACK/NACK transmitted in a certain PHICH channel corresponds to the UL transmission made by that UE.

There are several possible uses cases that need to be considered. These include UEs which are dynamically scheduled (with a scheduling grant), UEs that are persistently scheduled or that are using non-adaptive HARQ (no scheduling grant), and MU-MIMO UEs (overlapping PRB allocations).

In R1-080301 it was proposed to tie/link the PHICH channel/resources to the actual physical resources used for the UL transmissions.

Another approach is described in R1-074588, where for dynamic scheduling (transmission assigned with a scheduling grant) UEs are divided to one or more groups and for each UE group a PHICH group is assigned.

Note in this regard that a PHICH group corresponds to physical resources that can, at most, carry eight ACK/NACKs when a short CP is used, and fewer ACK/NACKs when a longer CP is used. It may be assumed that the UE knows the ACK/NACK resources within the PHICH group from the CSI of the DM RS, which is signaled to the UE in an UL grant for the corresponding UL transmission.

The PHICH group containing a maximum of eight PHICH is formed using spreading and repetition. For example, in the case of a normal CP the SF is 4 (for 4 sub-carriers) and the RF is 3, thus this particular PHICH group occupies 12 sub-carriers.

It has been agreed in 3GPP that the PHICH group will have eight BPSK modulated symbols which can be independently modulated on inphase (I) and quadrature (Q) branches. The BPSK modulated symbols will carry the information from eight PHICH channels. The eight PHICH symbols in a PHICH group will be distributed in frequency for diversity purposes, and may also be distributed in time for power balancing purposes (depending on the system configuration).

At least one problem exists in that at present there is no technique available for mapping from the physical resources (potentially including a PHICH index modifier) to the actual PHICH resources.

SUMMARY

In accordance with one exemplary embodiment of the invention there is a method that comprises receiving transmissions from a plurality of uplink physical resource blocks; and indicating an acknowledgement or negative acknowledgement for each of the received transmissions in a downlink channel, where the downlink channel comprises a plurality of n groups arranged for mapping the individual physical resource blocks such that linear increasing sequential indices of the physical resource blocks map to linear increasing sequential indices of the n groups which repeat until all the physical resource blocks are mapped. That there are a plurality of n groups necessarily implies that n is an integer greater than 1.

In accordance with another exemplary embodiment of the invention there is a computer readable memory storing a program of computer readable instructions that when executed by a processor result in actions comprising: after receiving transmissions on a plurality of uplink physical resource block, indicating an acknowledgement or negative acknowledgement for each of the received transmissions in a downlink channel. In this embodiment, the downlink channel comprises a plurality of n groups arranged for mapping the individual physical resource blocks such that linear increasing sequential indices of the physical resource blocks map to linear increasing sequential indices of the n groups which repeat until all the physical resource blocks are mapped.

In accordance with still another exemplary embodiment of the invention there is an apparatus comprising a receiver and a processor. The receiver is configured to receive transmissions on a plurality of uplink physical resource blocks. The processor is configured to map an acknowledgement or negative acknowledgement for each of the received transmissions to a downlink channel, in which the downlink channel comprises a plurality of n groups and the processor is configured to map the individual physical resource blocks such that linear increasing sequential indices of the physical resource blocks map to linear increasing sequential indices of the n groups which repeat until all the physical resource blocks are mapped.

In accordance with a further exemplary embodiment of the invention there is an apparatus comprising receive means (e.g., a receiver) and processing means (e.g., one or more processors). The receive means is receiving transmissions on a plurality of uplink physical resource blocks. The processing means is for mapping an acknowledgement or negative acknowledgement for each of the received transmissions to a downlink channel, in which the downlink channel comprises a plurality of n groups and the processing means is configured to map the individual physical resource blocks such that linear increasing sequential indices of the physical resource blocks map to linear increasing sequential indices of the n groups which repeat until all the physical resource blocks are mapped.

BRIEF DESCRIPTION OF THE DRAWINGS

In the Attached Drawing Figures:

FIG. 1 reproduces FIG. 4 of 3GPP TS 36.300, and shows the overall architecture of the E-UTRAN system.

FIG. 2 shows a simplified block diagram of various electronic devices that are suitable for use in practicing the exemplary embodiments of this invention.

FIGS. 3 and 4 reproduce FIGS. 3 and 4 from co-owned U.S. Provisional Patent Application 61/010,354 (now U.S. patent application Ser. No. 12/349,683, filed Jan. 7, 2009), where FIG. 3 shows a mapping diagram between PRB and PHICH illustrating use of a second parameter to shift the PHICH index mapped according to the first parameter to the PRB index, and where FIG. 4 is a mapping diagram between PRB and PHICH showing how the second parameter of FIG. 3 can be used to map two UEs allocated the same MU-MIMO UL PRB to different PHICH resources.

DETAILED DESCRIPTION

Figures 5, 6, 7:
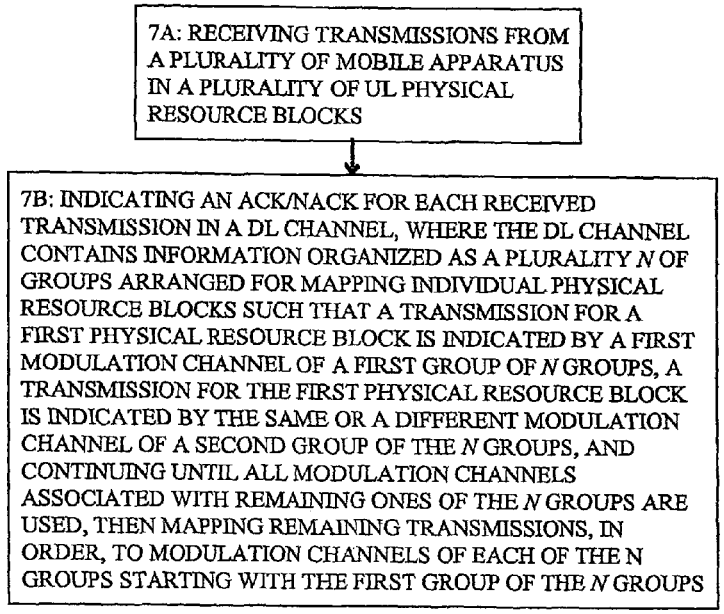
FIG. 5 illustrates a PHICH channel numbering scheme in accordance with exemplary embodiments of this invention.
FIG. 6 shows the PHICH mapping for a case of three PHICH groups, further in accordance with exemplary embodiments of this invention.
FIGS. 7-8 are logic flow diagrams that illustrate the operation of methods, and a result of execution of computer program instructions, in accordance with exemplary embodiments of this invention.

Certain exemplary embodiments of this invention overcome the foregoing and other problems by providing in at least one aspect thereof a mapping functionality that provides a number of benefits in connection with the physical transmission of signals on the PHICH.

In one aspect thereof the exemplary embodiments provide a CSI that is n-bits in length (e.g., n=3), and from these bits the ACK/NACK within a PHICH group can be identified.

Reference is first made to FIG. 2 for illustrating a simplified block diagram of various electronic devices that are suitable for use in practicing the exemplary embodiments of this invention. In FIG. 2 a wireless network 1 is adapted for communication with a UE 10 via a Node B (base station), more specifically an eNB 12. The network 1 may include a network control element (NCE) 14 that may include the MME/S-GW functionality shown in FIG. 1. The UE 10 includes a data processor (DP) 10A, a memory (MEM) 10B that stores a program (PROG) 10C, and a suitable radio frequency (RF) transceiver 10D for bidirectional wireless communications with the eNB 12, which also includes a DP 12A, a MEM 12B that stores a PROG 12C, and a suitable RF transceiver 12D. The eNB 12 is coupled via a data path 13 to the NCE 14, which may be implemented as the S1 interface shown in FIG. 1, which also includes a DP 14A and a MEM 14B storing an associated PROG 14C. At least one of the PROGs 10C and 12C is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DP 10A of the UE 10 and by the DP 12A of the eNB 12, or by hardware, or by a combination of software and hardware.

For the purposes of describing the exemplary embodiments of this invention the transmitter of the eNB 12 is assumed to include an I/Q modulator (MOD) 12E, and the eNB 12 is also assumed to include a scheduler functionality 12F.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Before describing in further detail the exemplary embodiments of this invention a discussion will first be made of several problems that are inherent in the currently proposed approaches for using the PHICH, and that are addressed by this invention.

A first problem relates to I-Q imbalance between the PHICH channels within a symbol. As a result, and in a case where there is non-ideal channel estimation (i.e., phase error), there may be a spill-over from the I channel into the Q channel, and vice versa. The spill-over from the I channel to the Q channel can be quantified as: $x\_Q=\sin(d\_e)*\text{abs}(PHICH\_I)$, where PHICH_I is the amplitude for the PHICH channel in the I channel, and d_e is the angle of the phase error. Correspondingly, the I channel will be degraded by a factor of $\cos(d\_e)$. Thus, it would be desirable to fill all of the PHICH I-channel and Q-channel pairs with one bit before beginning to use the second bit (note that activating the second channel effectively corresponds to transmitting a QPSK signal with the effects of the spill-over).

A second problem relates to power balancing between the PHICH groups. For example, for a UE 10 that is located far from the eNB 12 it is preferable to allocate the PHICH channels in different PHICH groups (for the case that there is more than one PHICH group) such that the power balancing option between the different PHICH groups is maintained.

Another problem relates to power balancing within a PHICH group. More specifically, to maximize the orthogonality of the reception of spreading codes for different PHICHs belonging to same PHICH group, these PHICHs should have a similar transmit power.

The exemplary embodiments of this invention provide a mapping technique that addresses and solves at least the foregoing problems.

The use of the exemplary embodiments of this invention provides a set of mapping rules for distributing and numbering PHICH channels. The mapping rules provide a number of advantages in terms of reducing the penalty of "spill-over" between the I and Q channels of the dual-BPSK modulated PHICH, and also provide power balancing between the PHICH groups. The use of the exemplary embodiments also enables an efficient technique for the eNB 12 to group UEs 10 with similar power to the same PHICH group.

In practice, it is desirable to follow four exemplary and non-limiting criteria:
transmission on one channel (e.g., the I channel) may be preferred over transmission on the other channel (e.g., the Q channel), however, in order to avoid any problems that may arise due to I-Q imbalance, it may be more preferred to alternate the I channel and Q channel preferences between PHICH groups;
power balancing is preferred between PHICH groups;
similar path loss UEs are assigned in same PHICH group; and
when applying a PHICH modifier, a default target value (a low value of the PHICH modifier) is used to address the foregoing three criteria.

Reference with regard to the PHICH modifier may be made to copending U.S. Provisional Patent Application 61/010,354, filed Jan. 7, 2008 (now U.S. patent application Ser. No. 12/349,683, filed Jan. 7, 2009), entitled "Method, Apparatus and Computer Program to Map a Downlink Resource to a Related Uplink Transmission".

FIGS. 3 and 4 herein reproduce FIGS. 3 and 4 from the co-pending US patent application referenced immediately above, and are useful when reviewing the disclosure thereof at least with regard to the PHICH modifier.

More specifically, for cases where multiple PRB allocations may be assigned to the same PHICH index the PHICH index modifier can be used.

The principle of the PHICH index modifier is shown in FIG. 3, which assumes X=2 (where X is the ratio: # of PRBs available for allocation/# of PHICH resources) since there are 25 PHICH resources in the bottom row for the 50 PRB resources available to the eNB scheduler 12F in the top row. FIG. 3 shows generally the principle of using the PHICH index modifier, which gives the option of performing a shift of an implicitly given PHICH index. This feature may be useful when considering, for example, MU MIMO, or when there are UL allocations of varying sizes.

Using only the parameter X to map PRBs to PHICH, the PRB with index 8 would map to the PHICH with index 4. But in the top row of FIG. 3 the eNB scheduler 12F allocates (by whatever manner, e.g., dynamic, semi-persistent) each of the shaded PRBs for UL resources to one or more UEs 10. The PRB for the PRB indices 8 through 12 each have a unique PHICH resource over which the eNB 12 can send a corresponding ACK or NACK. As seen at FIG. 3, the PHICH index modifier is (in this embodiment) a two-bit signal that indicates how much and in what direction to shift the PHICH index from that which maps to the PRB index using the first parameter X. Two bits enable the mapping of PRB index to PHICH index to be shifted to any of four PHICH resources rather than only the single PHICH index given by mapping with only the first parameter X. This is shown particularly for PRB index 8 mapping potentially to any of PHICH indices 3 through 6, instead of mapping only to PHICH index 4 for example. The same shifting can be done for each of the other PRB indices 9-12 of FIG. 3. By selectively shifting the mapping in this manner, each of the PRB indices 8-12 at the top row of FIG. 3 can map to a unique PHICH resource at the bottom row of FIG. 3.

Certain payload information may then be used to indicate to the UE 10 that an offset should be applied to the PHICH index that is implicitly given by the parameter X. One such piece of payload information could be precoding matrix indicator (PMI) or CSI information fields from the physical downlink control channel (PDCCH) payload for the uplink allocations themselves. In the example of FIG. 3 it is assumed that 2 bits are available, however more bits can be used to provide a greater variance to the index shift. Using the two-bit example of FIG. 3, as an example, the PHICH index modifier may be interpreted to modify the PHICH index (which is mapped by the first parameter X) as follows:

PHICH index modifier=00: Reduce value of PHICH index by 1

PHICH index modifier=01: Maintain value of PHICH index

PHICH index modifier=10: Increase value of PHICH index by 1

PHICH index modifier=11: Increase value of PHICH index by 2

The edges of the mapping can be addressed by a simple wrap-around functionality, such that if an allocated PHICH index is 25 (see FIG. 3) and the PHICH index modifier is to increase the value of the PHICH index by one, then the allocated PHICH index is (25+1) mod 25=1, which is the first PHICH index of the next sequential set of PHICH resources. Alternatively, a saturation function may be employed such that in the above case the modifiers are automatically adjusted such that they at maximum can address the maximum PHICH index. Given the above specific case of PHICH index of 25, the modifier becomes:

PHICH index modifier=00: Reduce value of PHICH index by 3

PHICH index modifier=01: Reduce value of PHICH index by 2

PHICH index modifier=10: Reduce value of PHICH index by 1

PHICH index modifier=11: Maintain value of PHICH index

A similar approach could also be applied for the PHICH index value of 1.

It is pointed out that the PHICH index modifier is not limited for use with two bits and, in fact, for certain applications the use of, for example, three bits may be preferable.

The PHICH index modifier approach operates equally well for the case of MU-MIMO. Consider an example of MU-MIMO in the UL, where two users may be assigned to the same physical resources, and thereby potentially to the same PHICH index. This situation is shown in FIG. 4, which assumes the same 50 PRBs available for allocation, X=2 so there are 25 PHICH resources for mapping, and both user 1 (a first UE 10) and user 2 (a second UE 10) are allocated a PRB for UL transmission with index=5. The PHICH index modifier is sent to each of user 1 and user 2 separately, such as in the payload of their MU-MIMO allocation, so each can be sent by the eNB 12 a different bit sequence for the PHICH index modifier. In response, each of user 1 and user 2 offsets the mapping of parameter X by a different value (or one does not offset at all, such as where PHICH index modifier is equal to 01 in the above example). As shown in FIG. 4, user 1 maps PRB index 5 to PHICH index 4, and user 2 maps PRB index 5 to PHICH index 3.

Described now by way of design examples is the PHICH mapping in accordance with the exemplary embodiments of this invention.

A first non-limiting assumption is that used PHICH modifiers are distance-wise close to one another, meaning that an index modifier that is close to 1 is preferred over one that is close to 7. The reason for preferring PHICH modifiers close to 1 is due to the fact that when this is the case, there is a higher probability that the PHICH resource is already reserved or covered by an actual UL allocation grant. If, for example, four UL PRBs are referring to the same PHICH channel, an uplink allocation of eight PRBs will "reserve" a pointer for two PHICH channels, and the +1 PHICH index modifier will fall within the already allocated or reserved PHICH resources.

FIG. 5 illustrates the PHICH channel numbering scheme in accordance with the exemplary embodiments of this invention. As may be appreciated, using a PHICH index modifier having a small value of 1 or −1 will "push" the PHICH channel to the other PHICH channel, while a modifier of 2 or −2 would be needed to enable dual-BPSK transmission. In this way there is obtained a simple way of mapping from physical resources to the PHICH channel, while at the same time using minimum variations of the PHICH index modifier.

In an approach where PRBs are mapped implicitly to a PHICH channel, the first PRB mapped to the PHICH is in this example is mapped to the PHICH Group 1 I channel (index 0), the second PRB is mapped to the PHICH Group 2 I channel (index 1), the third PRB is mapped to the PHICH Group 1 Q channel (index 2), and so forth. This approach can thus be seen to enable the UE 10 to implicitly know the correct PHICH channel. Note that which PRBs have association to which PHICH channel is definable for a specific implementation.

The mapping of PRB index to PHICH group illustrated at FIG. 5 may be equivalently presented with reference to the ordered PRB indices according to Table 1 below:

TABLE 1A

MAPPING OF PRB INDEX TO PHICH GROUP INDEX (FIG. 5)

| PRB index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PHICH group number | 1 | 2 | 1 | 2 | 1 | 2 | 1 | 2 | 1 | 2 | 1 | 2 | 1 | 2 | 1 | 2 |

Additionally, the PRB index maps according to FIG. 5 to the I and Q channels as shown below in Table 1B:

TABLE 1B

MAPPING OF PRB INDEX TO I/Q CHANNELS (FIG. 5)

| PRB index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PHICH channel | I | I | Q | Q | I | I | Q | Q | I | I | Q | Q | I | I | Q | Q |

For illustrative purposes, FIG. 6 shows a non-limiting example of the mapping for a case of three PHICH groups. The mapping of PRB index to the three PHICH groups illustrated at FIG. 6 may also be equivalently presented with reference to the ordered PRB indices according to Table 2 below (e.g., for the first 15 PRB indices):

TABLE 2A

MAPPING OF PRB INDEX TO PHICH GROUP INDEX (FIG. 6)

| PRB index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PHICH group number | 1 | 2 | 3 | 1 | 2 | 3 | 1 | 2 | 3 | 1 | 2 | 3 | 1 | 2 | 3 | 1 |

Additionally, the PRB index maps according to FIG. 6 to the I and Q channels as shown below in Table 1B (e.g., for the first 15 PRB indices):

TABLE 2B

MAPPING OF PRB INDEX TO I/Q CHANNELS (FIG. 6)

| PRB index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PHICH channel | I | I | I | Q | Q | Q | I | I | I | Q | Q | Q | I | I | I | Q |

The arrangement of the data from FIGS. 5-6 shown at Tables 1A and 2A above make clear that according to an exemplary embodiment of the invention, the PRB indices, when ordered in a linearly increasing sequence by index number, map to the linearly increasing ordered sequence of PHICH group numbers (or group index), and the linearly increasing ordered sequence of PHICH group numbers repeat sequentially until all PRBs are mapped. This satisfies the power balancing between PHICH groups noted above.

The arrangement of the data from FIGS. 5-6 shown at Tables 1B and 2B above make clear that according to an exemplary embodiment of the invention, the ordered PRB indices map to I channels (e.g., real channels/parts) of the PHICH for each of the PHICH groups and thereafter map to Q channels (e.g., imaginary channels/parts) for each of the PHICH groups, and repeats this mapping sequentially across the PHICH groups until all PRBs are mapped. This satisfies the preference for the I channel over the Q channel noted above.

Thus the first or leading set of n indices (PRB index 0-2 in Table 2B, for example) of the linear increasing sequential indices of the physical resource blocks map to an in-phase I modulation of the downlink channel, and the next subsequent set of n indices (PRB indices 3-5 of Table 2B, for example) of the linear increasing sequential indices of the physical resource blocks map to a quadrature Q modulation of the downlink channel. The above pattern is repeated for each set of n indices of the linear increasing sequential indices of the physical resource blocks for all of the physical resource blocks. If one considers each sequential pair of sets (each set having n PRB indices), then for each pair one set of the pair maps to an in-phase I modulation of the downlink channel and the other set of the pair maps to a quadrature modulation of the downlink channel. It can be seen that the sets of n indices are arranged such that each set of PRB indices (each 'full' set having exactly n PRB indices; a last set may be incomplete and have less than n PRB indexes to map) maps once and only once to each of the n PHICH groups.

Having thus mapped each PRB on which the eNB receives data from the plurality of UEs to a unique PHICH, the eNB then sends either an ACK or a NACK to the individual UEs from which the data was received on the PHICH which maps to that respective UL PRB. The UEs operate similarly, but only need to map their own UL PRB(s) to the respective PHICH, and tune to that PHICH to receive the ACK or NACK sent by the eNB.

It should be noted that when discussing the PHICH index modifier it was assumed that it can take both positive and negative values. The actual range of values may assume any needed values, such as the range from −3 to +5, or from −2 to +5, as two non-limiting examples (which assume the use of at least three bits to express the PHICH index modifier).

Based on the foregoing it should be apparent that the exemplary embodiments of this invention provide a method, apparatus and computer program product(s) to map physical resources to PHICH resources.

Figure 8:
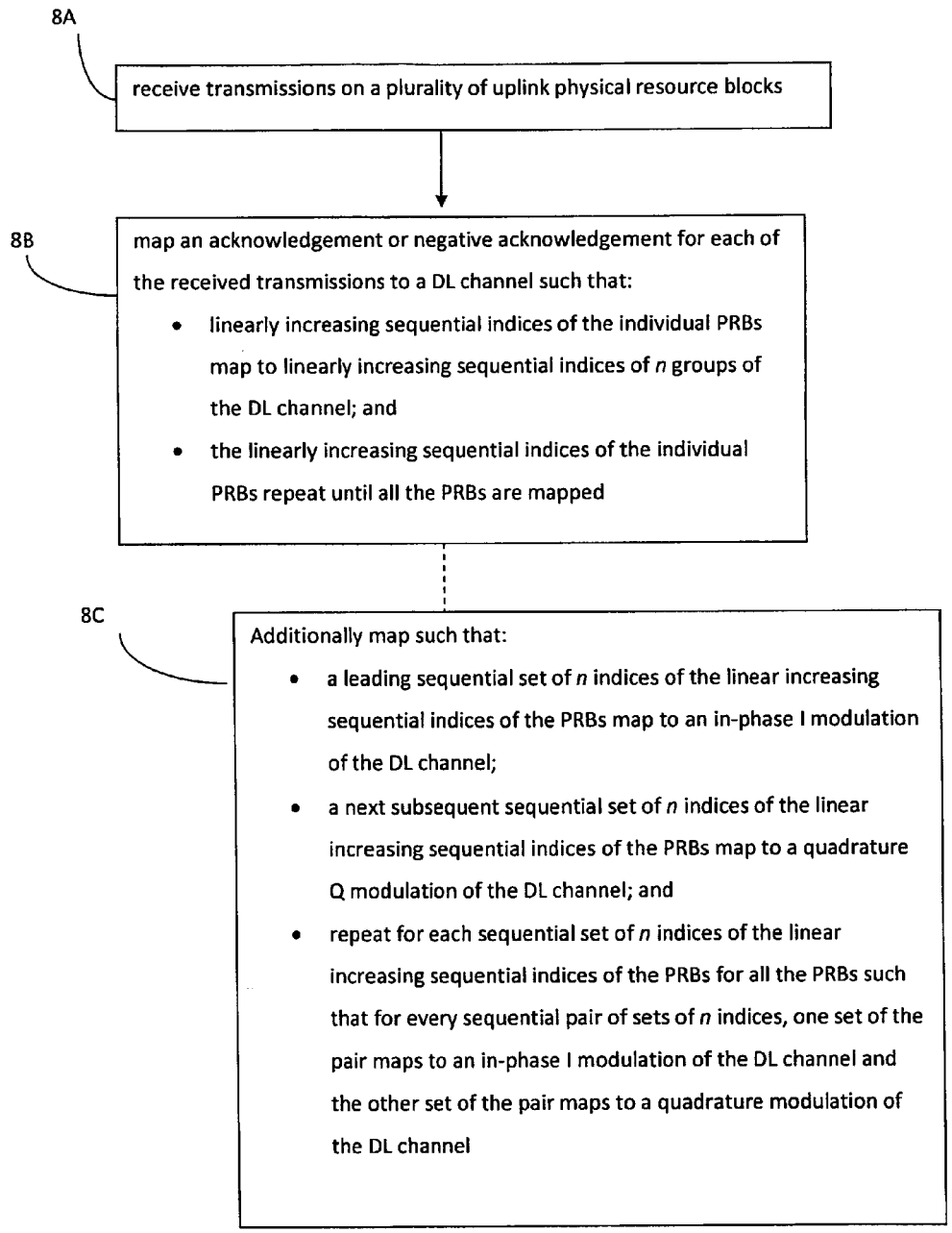

Reference is made to FIGS. 7-8 for showing logic flow diagrams that illustrate the operation of methods, and results of execution of computer program instructions, in accordance with the exemplary embodiments of this invention. In Block 7A of FIG. 7 receiving transmissions from a plurality of UL PRBs, and in Block 7B indicating an ACK/NACK for each received transmission in a DL channel, where the DL channel comprises a plurality of groups arranged for mapping individual physical resource blocks such that a transmission for a first physical resource block is indicated by a first modulation channel of a first group of the n groups, a transmission for the first physical resource block is indicated by the same or a different modulation channel of a second group of the n groups, and continuing until all modulation channels associated with remaining ones of the n groups are used, then mapping remaining transmissions, in order, to modulation channels of each of the n groups starting with the first group of the n groups.

The method as in the preceding paragraph, where the DL channel is a PHICH.

The method as in the preceding paragraphs, comprising use of physical resource block indicator modifiers.

FIG. 8 illustrates the mapping as generally arranged in exemplary Tables 1A-2B above. At block 8A transmissions are received on a plurality of uplink physical resource blocks. At block 8B an acknowledgement or negative acknowledgement for each of the received transmissions is mapped to a downlink channel. The mapping is such that linearly increasing sequential indices of the individual PRBs map to linearly increasing sequential indices of n groups of the DL channel, and the linearly increasing sequential indices of the individual PRBs repeat until all the PRBs are mapped to an index of the n groups (where n is an integer greater than one). At block 8C there are additional particulars of the mapping as seen at Tables 1B and 2B above: a leading sequential set of n indices of the linear increasing sequential indices of the PRBs is mapped to an in-phase I modulation of the DL channel; a next subsequent sequential set of n indices of the linear increasing sequential indices of the PRBs is mapped to a quadrature Q modulation of the DL channel; and then repeat for each sequential set of n indices of the linear increasing sequential indices of the PRBs for all the PRBs such that for every sequential pair of sets of n indices, one set of the pair maps to an in-phase I modulation of the DL channel and the other set of the pair maps to a quadrature modulation of the DL channel The various blocks shown in FIGS. 7-8 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of prestored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN-LTE) system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The invention claimed is:

1. A method comprising:
   receiving transmissions on a plurality of uplink physical resource blocks;
   mapping an acknowledgement or negative acknowledgement for each of the received transmissions to at least one physical resource block on a downlink channel, the downlink channel being in a group selected from a plurality of groups;
   wherein the mapping depends on at least one of:
      alternating in-phase I channel and quadrature Q channel preferences between the plurality of groups;
      power balancing between the plurality of groups; and
      path loss of user equipment; and
   transmitting the acknowledgement or negative acknowledgement for each of the received transmissions on said downlink channel.

2. The method according to claim 1, wherein the power balancing between the plurality of groups comprises changing the selection of the groups linearly, until all the physical resource blocks are mapped.

3. The method according to claim 1, wherein the alternating in-phase I channel and quadrature Q channel preferences between the plurality of groups are further arranged for mapping such that:
   a leading sequential set of n indices of linearly increasing sequential indices of the physical resource blocks map to an in-phase I modulation of the downlink channel;
   a next subsequent sequential set of n indices of the linearly increasing sequential indices of the physical resource blocks map to a quadrature Q modulation of the downlink channel; and
   repeating for each sequential set of n indices of the linearly increasing sequential indices of the physical resource blocks for all the physical resource blocks such that for every sequential pair of sets of n indices, one set of the pair maps to an in-phase I modulation of the downlink channel and the other set of the pair maps to a quadrature modulation of the downlink channel.

4. The method according to claim 1, wherein the mapping based at least in part on path loss of user equipments further comprises mapping acknowledgements or negative acknowledgements of user equipments with similar path loss in a same group.

5. The method according to claim 1, wherein the downlink channel comprises a physical hybrid automatic repeat request channel.

6. A computer program product comprising a non-transitory computer-readable medium bearing computer program code embodied therein for use with a computer, the computer program code comprising:

code for receiving transmissions on a plurality of uplink physical resource blocks;

code for mapping an acknowledgement or negative acknowledgement for each of the received transmissions to at least one physical resource block on a downlink channel, the downlink channel being in a group selected from a plurality of groups;

wherein the mapping depends on at least one of:
alternating in-phase I channel and quadrature Q channel preferences between the plurality of groups;
power balancing between the plurality of groups; and
path loss of user equipment;

and code for transmitting the acknowledgement or negative acknowledgement for each of the received transmissions on said downlink channel.

7. An apparatus comprising:
at least one processor;
at least one memory including computer program code;
the at least one memory and the computer program code configured to, with the at least one processor, cause the apparatus to perform at least the following:
receive transmissions on a plurality of uplink physical resource blocks;
map an acknowledgement or negative acknowledgement for each of the received transmissions to at least one physical resource block in a plurality of groups on a downlink channel, the downlink channel being in a group selected from a plurality of groups;
wherein the mapping depends on at least one of:
alternating in-phase I channel and quadrature Q channel preferences between the plurality of groups;
power balancing between the plurality of groups; and
path loss of user equipment;
and
at least one transmitter configured to transmit the acknowledgement or negative acknowledgement for each of the received transmissions on said downlink channel.

8. The apparatus according to claim 7, wherein the alternating in-phase I channel and quadrature Q channel preferences between the plurality of groups further comprises:
a leading sequential set of n indices of linearly increasing sequential indices of the physical resource blocks mapping to an in-phase I modulation of the downlink channel;
a next subsequent sequential set of n indices of the linearly increasing sequential indices of the physical resource blocks mapping to a quadrature Q modulation of the downlink channel; and
repeating for each sequential set of n indices of the linearly increasing sequential indices of the physical resource blocks for all the physical resource blocks such that for every sequential pair of sets of n indices, one set of the pair mapping to an in-phase I modulation of the downlink channel and the other set of the pair mapping to a quadrature modulation of the downlink channel.

9. The apparatus according to claim 7, wherein the downlink channel comprises a physical hybrid automatic repeat request channel.

10. The apparatus according to claim 7, wherein the apparatus is comprised in an access node of a wireless communication network.

11. A method comprising:
providing a transmission on a plurality of uplink physical resource blocks on an uplink channel;
receiving an acknowledgement or negative acknowledgement from a downlink channel for each transmission on the uplink channel comprising said plurality of uplink physical resource blocks, the acknowledgement or negative acknowledgement being mapped to at least one physical resource block on the downlink channel, the downlink channel being in a group selected from a plurality of groups, and the mapping depending on at least one of:
alternating in-phase I channel and quadrature Q channel preferences between the plurality of groups;
power balancing between the plurality of groups; and
path loss of user equipment.

12. The method according to claim 11, wherein the power balancing between the plurality of groups comprises changing the selection of the groups linearly, until all the physical resource blocks are mapped.

13. The method according to claim 11, wherein the alternating in-phase I channel and quadrature Q channel preferences between the plurality of groups are further arranged for mapping such that:
a leading sequential set of n indices of linearly increasing sequential indices of the physical resource blocks map to an in-phase I modulation of the downlink channel;
a next subsequent sequential set of n indices of the linearly increasing sequential indices of the physical resource blocks map to a quadrature Q modulation of the downlink channel; and
repeating for each sequential set of n indices of the linearly increasing sequential indices of the physical resource blocks for all the physical resource blocks such that for every sequential pair of sets of n indices, one set of the pair maps to an in-phase I modulation of the downlink channel and the other set of the pair maps to a quadrature modulation of the downlink channel.

14. The method according to claim 11, wherein the downlink channel comprises a physical hybrid automatic repeat request channel.

15. The method according to claim 11, the method being executed by a terminal.

16. A computer program product comprising a non-transitory computer-readable medium bearing computer program code embodied therein for use with a computer, the computer program code comprising:
code for providing a transmission on a plurality of uplink physical resource blocks on an uplink channel;
code for receiving an acknowledgement or negative acknowledgement from a downlink channel for each transmission on the uplink channel comprising said plurality of uplink physical resource blocks;
the acknowledgement or negative acknowledgement being mapped to at least one physical resource block on the downlink channel, the downlink channel being in a group selected from a plurality of groups, and the mapping depending on at least one of:
alternating in-phase I channel and quadrature Q channel preferences between the plurality of groups;
power balancing between the plurality of groups; and
path loss of user equipment.

17. An apparatus comprising:
at least one transmitter configured to provide a transmission on a plurality of uplink physical resource blocks on an uplink channel;
at least one receiver configured to receive an acknowledgement or negative acknowledgement from a downlink channel for each transmission on the uplink channel comprising said plurality of uplink physical resource blocks;
the acknowledgement or negative acknowledgement being mapped to at least one physical resource block on the downlink channel, the downlink channel being in a group selected from a plurality of groups, and the mapping depending on at least one of:

alternating in-phase I channel and quadrature Q channel preferences between the plurality of groups;

power balancing between the plurality of groups; and path loss of user equipment.

18. The apparatus according to claim 17, wherein the alternating in-phase I channel and quadrature Q channel preferences between the plurality of groups further comprising:
- a leading sequential set of n indices of linearly increasing sequential indices of the physical resource blocks mapping to an in-phase I modulation of the downlink channel;
- a next subsequent sequential set of n indices of the linearly increasing sequential indices of the physical resource blocks mapping to a quadrature Q modulation of the downlink channel;
- and the processor is further configured to repeat for each sequential set of n indices of the linearly increasing sequential indices of the physical resource blocks for all the physical resource blocks such that for every sequential pair of sets of n indices, one set of the pair mapping to an in-phase I modulation of the downlink channel and the other set of the pair mapping to a quadrature modulation of the downlink channel.

19. The apparatus according to claim 17, wherein the downlink channel comprises a physical hybrid automatic repeat request channel.

20. The apparatus according to claim 17, wherein the apparatus is comprised in a terminal.

\* \* \* \* \*